United States Patent
Ghosh et al.

(10) Patent No.: US 11,514,115 B2
(45) Date of Patent: Nov. 29, 2022

(54) FEED OPTIMIZATION

(71) Applicant: Microsoft Technology Licensing, LLC, Redmond, WA (US)

(72) Inventors: Souvik Ghosh, Saratoga, CA (US); Timothy Paul Jurka, Redwood City, CA (US); Sergei Tolmanov, Danville, CA (US); Yijie Wang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 15/844,032

(22) Filed: Dec. 15, 2017

(65) Prior Publication Data

US 2019/0188323 A1 Jun. 20, 2019

(51) Int. Cl.
*G06F 16/9535* (2019.01)
*H04L 67/306* (2022.01)
*G06Q 50/00* (2012.01)
*G06N 20/00* (2019.01)
*H04L 67/50* (2022.01)

(52) U.S. Cl.
CPC ......... *G06F 16/9535* (2019.01); *G06N 20/00* (2019.01); *G06Q 50/01* (2013.01); *H04L 67/306* (2013.01); *H04L 67/535* (2022.05)

(58) Field of Classification Search
CPC ..... G06F 16/9535; G06F 17/30; G06N 20/00; G06Q 50/01; H04L 67/22; H04L 67/306
USPC .......................................................... 707/723
See application file for complete search history.

(56) References Cited

U.S. PATENT DOCUMENTS

| | | | |
|---|---|---|---|
| 2014/0006489 A1* | 1/2014 | Himel | G06Q 50/01 709/204 |
| 2014/0258198 A1* | 9/2014 | Spivack | G06Q 50/01 706/21 |

* cited by examiner

*Primary Examiner* — Hosain T Alam
*Assistant Examiner* — Tracy M McGhee
(74) *Attorney, Agent, or Firm* — Schwegman Lundberg & Woessner, P.A.

(57) ABSTRACT

In an example, a plurality of potential feed objects are obtained. An identification of a user performing a navigation command in a user interface is also obtained, the navigation command causing a feed to be displayed or updated. The identification of the user and the plurality of potential feed objects are fed to a machine learned feed object ranking model, the feed object ranking model having been trained via a machine learning algorithm to calculate a score for each of the potential feed objects, the score being based on a combination of a likelihood that the user will perform an interaction, via the user interface, on the potential feed object, likelihoods that the user's interaction will cause one or more downstream events by other users, and a value of the one or more downstream events to a social networking service. The plurality of feed objects are ranked by their scores.

20 Claims, 8 Drawing Sheets

FEED OPTIMIZATION

TECHNICAL FIELD

The present disclosure generally relates to technical problems encountered in machine learned models. More particularly, the present disclosure relates to using machine learned models to optimize social networking service feeds.

BACKGROUND

Social networking services are online platforms that people use to build social networks or social relations with other people. In recent years it has become popular for social networking services to provide feeds to users, where updates or items of interest can be presented to users who have logged into the service. The feed may contain, for example, indications that a social networking connection for a user has been promoted, has changed jobs, etc. The feed may also contain articles of interest to the user, either because they have some connection to one or more of the user's social networking connections (e.g., an article written by a friend) or because they are linked to an area of interest for the user, as identified by the social network service (e.g., the article is on a subject the user has identified as an area of interest in their user profile).

It can be challenging for the social networking service to determine which of many potential items should be displayed in the feed, and the order in which they should be displayed. This is typically handled via one or more algorithms implemented by the social networking service for selection and ranking of potential items to display. These algorithms, however, are based on determining the likelihood that the user will interact with the item in some way (e.g., select it, share it, like it, etc.). Such solutions, however, do not adequately capture the value of the interaction to the system. This is due to the presence of downstream effects in many social networking services.

Downstream effects involve effects to the user and to the social networking service as a whole that are related to a particular immediate action but occur later than the particular immediate action. One major example is the concept of viral actions, where a user who shares an item with other users in his or her social network could cause those other users to interact with the item and possibly share the item with additional users, and so on. From a technical perspective it is quite complex to design an algorithm that can adequately capture the likelihood of a user action causing a downstream event, let alone the value of such a downstream event to the user or to the social networking service itself.

BRIEF DESCRIPTION OF THE DRAWINGS

Some embodiments of the technology are illustrated, by way of example and not limitation, in the figures of the accompanying drawings.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will evident, however, to one skilled in the art, that the present disclosure may be practiced without all of the specific details.

In an example embodiment, a machine learned model is used to determine the probability of viral actions being taken on items that can be potentially displayed in a feed of a social networking service. This probability may then be used to select and rank the items that can be potentially displayed, and this ranking may then be used to actually display one or more of the items in the social networking feed.

Figure 1:
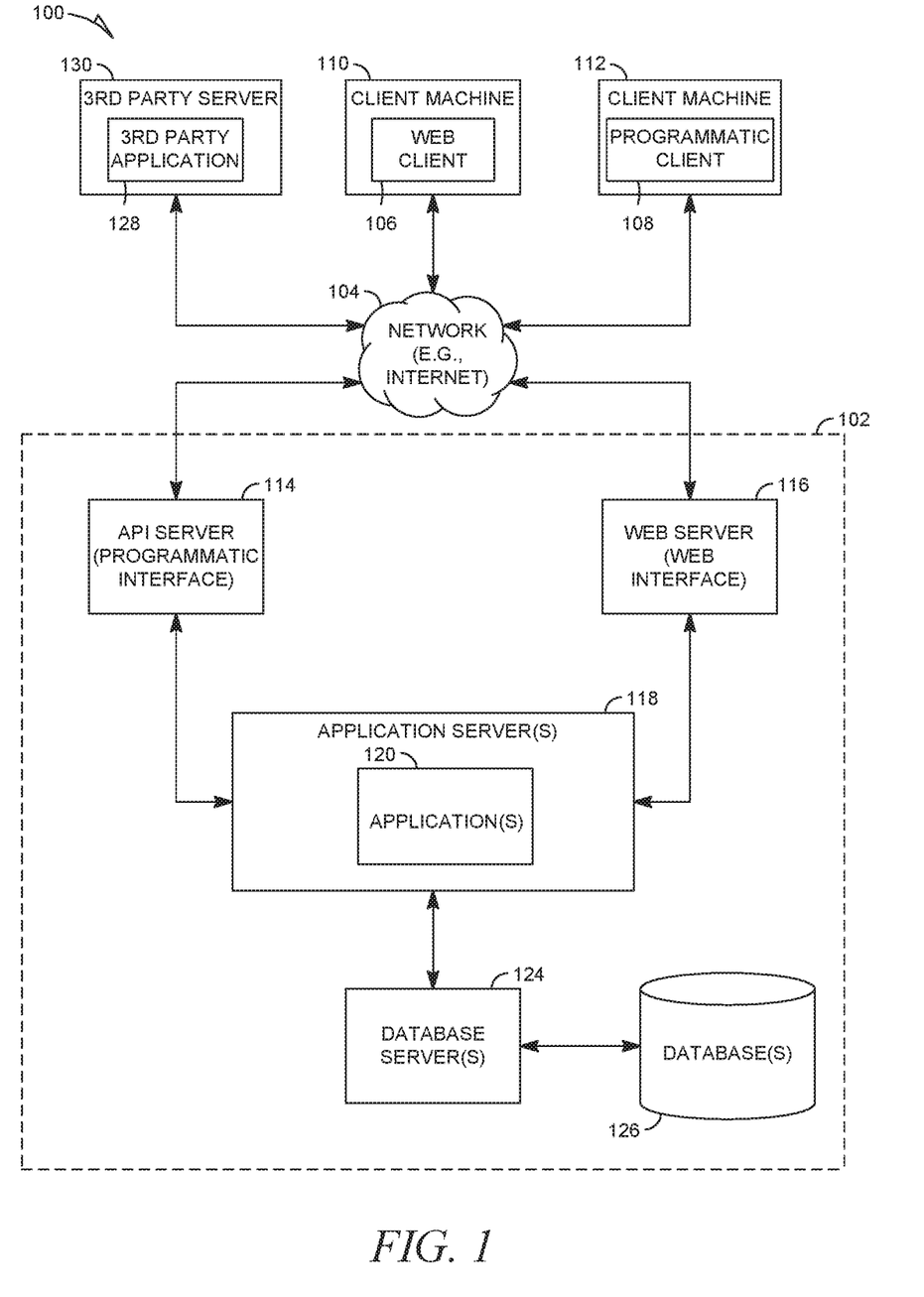
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application servers) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., the API server 114) may communicate with the mobile app and the application server(s) 118 in order to make the features of the present disclosure available on the mobile device.

Figure 2:
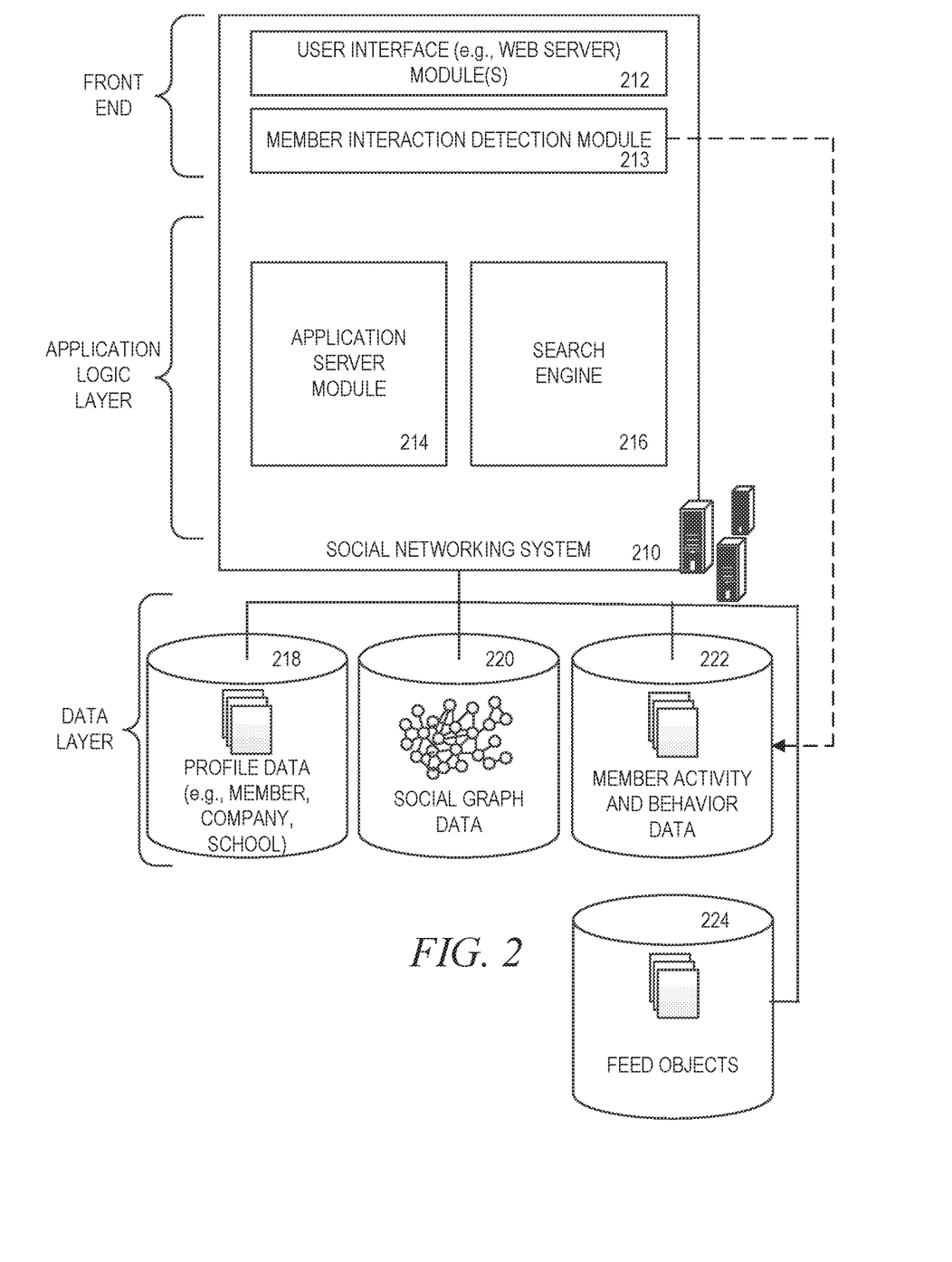
FIG. 2 is a block diagram showing the functional components of a social networking system consistent with some embodiments of the present disclosure.

In some embodiments, the networked system 102 may comprise functional components of a social networking service. FIG. 2 is a block diagram showing the functional components of a social networking system 210 consistent with some embodiments of the present disclosure. In some embodiments, a search engine 216 may reside on the application server(s) 118 in FIG. 1. However, it is contemplated that other configurations are also within the scope of the present disclosure.

As shown in FIG. 2, a front end may comprise a user interface module (e.g., a web server 110) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, "following" another member typically is a unilateral operation and, at least in some embodiments, does not require acknowledgement or approval by the member who is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application 120 may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing of and searching for content within the social networking service, such as the indexing of and searching for data or information contained in the data layer, such as profile data (stored, e.g., in the profile database 218), social graph data (stored, e.g., in the social graph database 220), and member activity and behavior data (stored, e.g., in the member activity and behavior database 222), and/or information in a feed objects database 224. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

The feed objects database 224 may contain objects that can be displayed in feeds of one or more members of the social networking service. A feed is a data format used for providing users with frequently updated content. In the social networking service, members may view their feed when they, for example, log into the social networking service. The feed contains one or more objects that the social networking service believes may be of interest to the user. The user feed may contain items from different categories, e.g., job postings, user postings, suggestions for new connections, sponsored posts, etc. Creating the feed means ranking the items from the different categories, merging the items from the different categories, and creating the user feed, which presents the items in sequential order.

The process of ranking items and categories is often very complex, as different goals are desired, such as optimizing user experience and generating revenue from the different categories. This process is often tedious and requires a great deal of experimentation.

While the feed objects database 224 is depicted here as containing the feed objects, it should be noted that it is not necessary that all these potential feed objects be aggregated in a single database. In some example embodiments, the feed objects may be located in various other databases either in lieu of or in addition to the feed objects database 224, and whatever component desires to access feed objects, such as the search engine 216, can retrieve the feed objects across multiple databases. For simplicity, however, the present document will describe feed objects as being obtained from the feed objects database 224.

Figure 3:
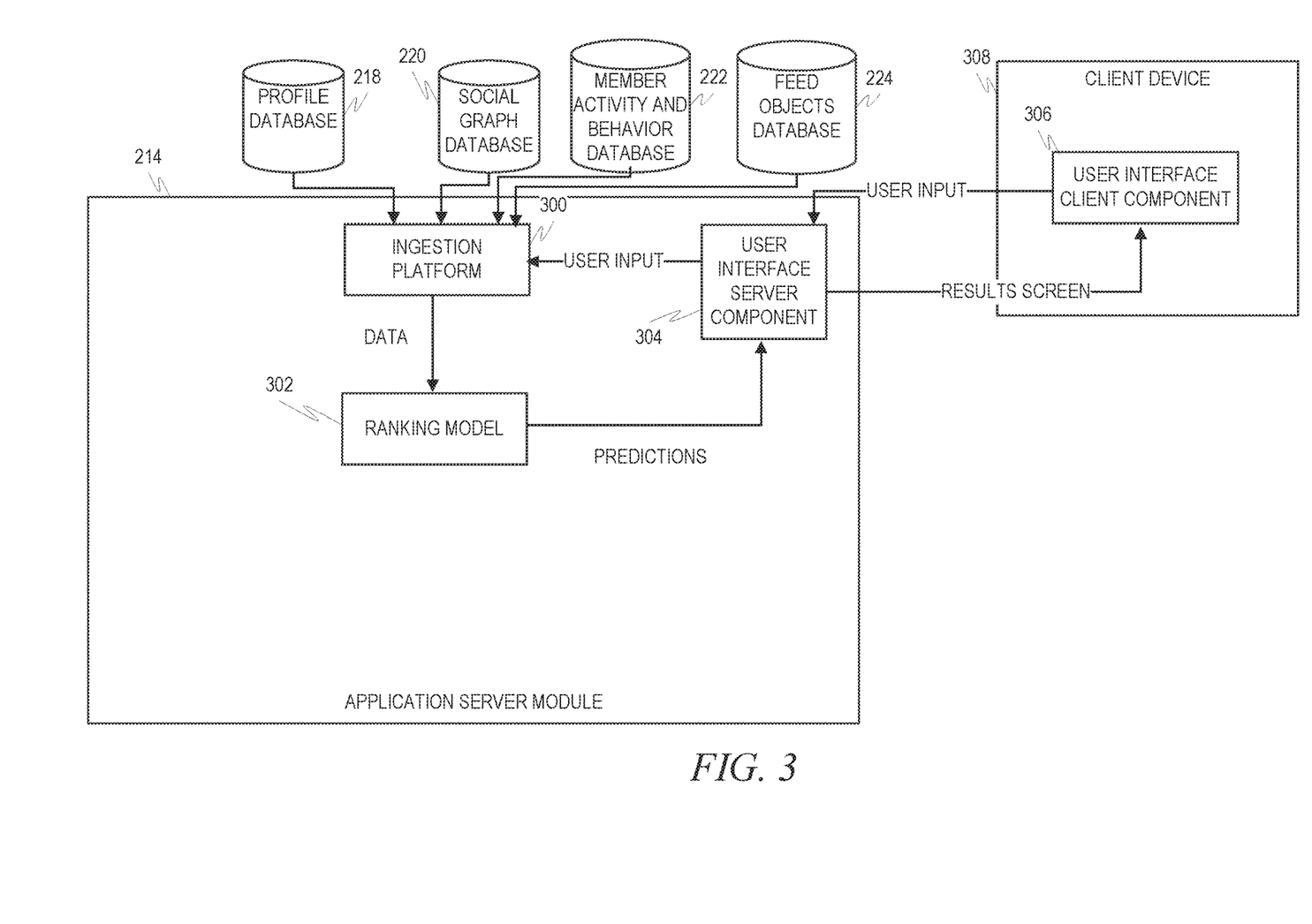
FIG. 3 is a block diagram illustrating an application server module of FIG. 2 in more detail, in accordance with an example embodiment.

FIG. 3 is a block diagram illustrating the application server module 214 of FIG. 2 in more detail, in accordance with an example embodiment. While in many embodiments, the application server module 214 will contain many sub-components used to perform various different actions within the social networking system 210, in FIG. 3 only those components that are relevant to the present disclosure are depicted.

Here, an ingestion platform 300 obtains information from the profile database 218, the social graph database 220, the member activity and behavior database 222, and/or the feed objects database 224 relevant to a ranking model 302. At training time, the ingestion platform 300 sends this information to the ranking model 302 in order to train the ranking model 302, whereas at ranking time, such as when a social networking service needs to determine which feed objects to present to a particular user and in what order, the ingestion platform 300 sends information to the ranking model 302 in order to allow the ranking model 302 to output a ranking of the various potential feed objects to be displayed in the user's feed.

In some example embodiments, this information is transmitted in the form of feature vectors. For example, each member profile may have its own feature vector funned of the information in the profile database 218, the social graph database 220, and the member activity and behavior database 222. In other example embodiments, the ingestion platform 300 sends raw information to the ranking model 302, and the ranking model 302 creates its own feature vectors from the raw information.

A user interface server component 304 communicates with a user interface client component 306 located on a client device 308 to run the ranking model 302 and use its results to display or update a feed to a user. This may be performed in response to a user input, such as a navigation input to a web page that includes the feed. For example, a user could instruct the user interface client component 306 to log into a social networking service account. This log-in information could then be sent to the user interface server component 304, which can use this information to instruct the ingestion platform 300 to retrieve the appropriate information from the profile database 218, the social graph database 220, the member activity and behavior database 222, and/or the feed objects database 224.

The results from the ranking model 302 could then be sent to the user interface server component 304, which, along with the user interface client component 306, could select and format appropriate feed objects for display to the user. Details about how these objects could be displayed on the client device 308 via the user interface client component 306 will be described in more detail below.

Figure 4:
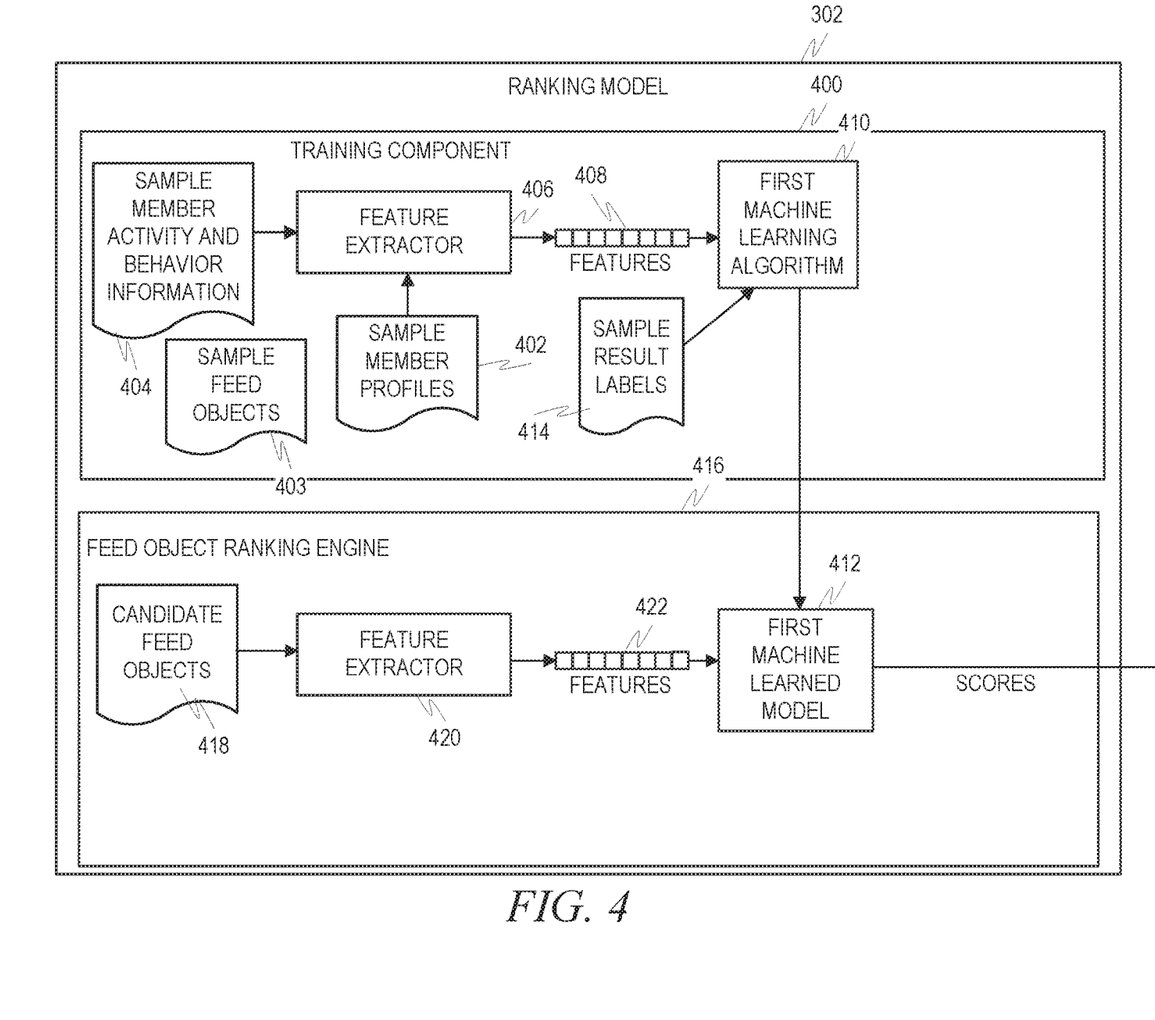
FIG. 4 is a block diagram illustrating a ranking model of FIG. 3 in more detail, in accordance with an example embodiment.

FIG. 4 is a block diagram illustrating the ranking model 302 of FIG. 3 in more detail, in accordance with an example embodiment. In a training component 400, sample member profiles 402, sample feed objects 403, and/or sample member activity and behavior information 404 are fed to a feature extractor 406, which acts to extract curated features 408 from the sample member profiles 402, sample feed objects 403, and/or sample member activity and behavior information 404. A feature is a variable pertaining to an input piece of data. Since the input may, in some example embodiments, be data related to a member of a social networking service, such as a member profile, member usage and/or activity data, or social graph information, the feature may be, for example, a portion of the member profile, member usage and/or activity data, or social graph. The feature may also be a variable calculated from a portion of the data, such as an average, sum, difference, measurement, etc. The feature may also be some aspect of the sample feed objects, such as title, frequently appearing terms, and/or various metrics about the object, such as frequency of occurrence of key words.

In an example embodiment, the curated features 408 are then used as input to a machine learning algorithm 410 to train a machine learned model 412 to generate a probability that a feed object should be displayed to a particular user. While this probability may be based on the likelihood that the user may interact in some way with the feed object, as will be described in more detail below it may also be based on the effect of viral actions by the user or downstream users, as well as the relative value of these effects on the social networking service as a whole. In certain types of machine learning algorithms, the training may include providing sample result labels 414 to the machine learning algorithm 410. Each of these sample result labels 414 is a score indicating a likelihood that a corresponding sample feed object should be displayed to a user.

The machine learning algorithm 410 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

In a feed object ranking engine 416, candidate feed objects 418 are fed to a feature extractor 420, which acts to extract curated features 422 from the candidate feed objects 418. The curated features 422 are then used as input to the machine learned model 412, which outputs a score indicating the likelihood that the corresponding candidate feed objects 418 should be displayed in the feed.

In an example embodiment, the machine learned model 412 is trained in such a manner that it is able to output a score for each potential feed item. This score is based on a principled approach for handling viral actions. Viral actions are treated differently than regular clicks/selections because viral actions allow for the item to propagate through the network and increase visibility. Not all viral actions are equal, for example, varying either by type or by actor. For example, a share by the president of a multinational company has more effect than a share by a factory worker. Likewise, a share action may have more effect than a like action.

The score generated by the machine learned model 412 may be called "expected engagement" and may be represented mathematically as E(m, u), which is the expected engagement of showing feed item u to user m. This score includes expected downstream engagement. This score may be calculated according to the following formula:

$$E(m,u)=P[A \neq \text{Null}]+\beta \Sigma_{A \in VA} P[A]*DE(m,u|A)$$

A is a random variable (random set) denoting the possible actions taken by m. This will include every kind of click-based action—click, like, share, comment, job view, connect, etc. The set of viral actions is VA, which can be, for example, {like, share, comment}.

DE(m, u|A) is the incremental downstream engagement on object u if user m takes a viral action A. An optimal value should be chosen to maximize the expected long-term true-north metric from user m β (which is less than or equal to 1) is the time discount factor determining the value of engagement in this current session versus that in a later session.

Of course, in some example embodiments, one or more of these terms may be difficult itself to estimate from the technical point of view. For example, DE(m, u|A) may be computationally challenging to estimate due to the exponential nature of viral actions. Additionally, as the model goes further and further downstream, there is a greater likelihood of cycles occurring in the social network being modeled. For example, if a first user shares an item with his network of 25 other users, then it is possible that one of those users may perform an action on the item that causes yet another action by the first user, such as liking the item which could cause the first user to then like the item. These cycles can cause difficulty in modeling downstream behavior. In an example embodiment, both the computational complexity and the cyclic aspect can be remedied by limiting downstream behavior to one degree. In other words, the machine learned model is limited to looking only at downstream behavior that is one degree from the user m.

In one example embodiment, the term DE(m, u|A) may be estimated using the following formula.

$$DE(m,u|A)=\#(N_m \backslash N_a)E(m,A)+\#(N_m \cap N_a)(E(m,A)-E(a,A_a))^+$$

$N_m$ and $N_a$ represent the networks of users m and a, respectively. E(m, A) is the average engagement of members in the network of m on objects coming from m because of action A. E(m, A)=Avg Actions. The function $x^+$ is the positive part of x, i.e., $x^+=x$ if $x>0$ and 0 otherwise.

The estimate is split into two parts:
(1) Network of m that is not in the network of a: In this group the estimated engagement is $\#(N_m \backslash N_a)$ E(m, A).
(2) Network of m that is also in the network of a: In this group, if expected engagement due to a viral action of m is more than that due to the action from a then there may be additional engagement due to m taking action A.

In some example embodiments, alternative methods may be used for this estimate. Examples include estimating DE by examining the impact of m and not incorporating any of the previous actors, examining the incremental impact m can have in comparison to the actor and the root actor, and using an average DE from m with an Inverse Document Frequency (IDF)-style discounting on the average engagement on the object so far, such as $$DE(m,u|A)=E(m,A)/f(\text{impressions, interactions}),$$

where f is some increasing function. In the latter case, DE is down-weighted if there are already a lot of impressions and interactions in the object.

In some example embodiments, not only the type of the viral action but content related to the viral action may be taken into account by the machine learned model 412. Specifically, while some viral actions themselves do not contain content beyond their type, such as a "like" action, other viral actions sometimes do contain content in addition to their type, such as text entered as comments when sharing a feed object. In some example embodiments, for instance, this text may be analyzed, such as by using natural language processing techniques, and this analysis may be used to create one or more feature vectors used by the machine learned model 412 to output the score.

Figure 5:
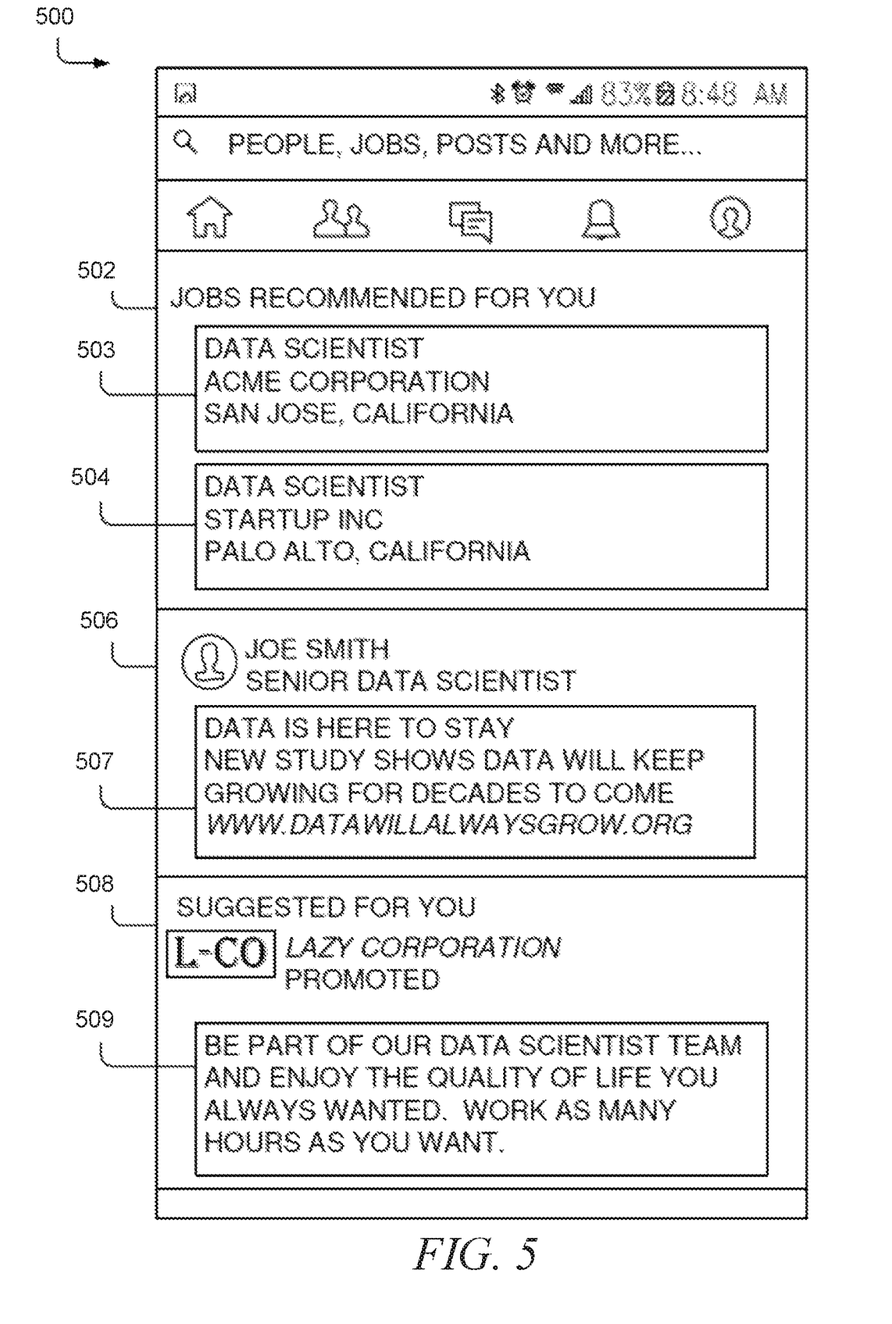
FIG. 5 is a screenshot of a user feed that includes items in different categories, according to some example embodiments.

FIG. 5 is a screenshot of a user feed 500 that includes items in different categories, according to some example embodiments. In the example embodiment of FIG. 5, the user feed 500 includes different categories, such as job recommendations 502, user posts 506, and sponsored items 508, and other embodiments may include additional categories.

In one example embodiment, the user feed 500 provides the job recommendations 502 (e.g., job posts 503 and 504) that match the job interests of the user and that are presented with a specific job search request from the user.

The user posts 506 include items 507 posted by users of the social networking service, such as connections of the user, to make comments on the social networking service or include articles or webpages of interest.

The sponsored items 508 are items 509 placed by sponsors of the social networking service, which pay a fee for posting those items on user feeds, and may include advertisements or links to webpages that the sponsors want to promote.

Although the categories are shown as separated within the user feed 500, the items from the different categories may be intermixed, and not just be presented as a block. Thus, the user feed 500 may include a large number of items from each of the categories, and the social networking service decides the order in which these items are presented to the user based on the desired utilities.

Figure 6:
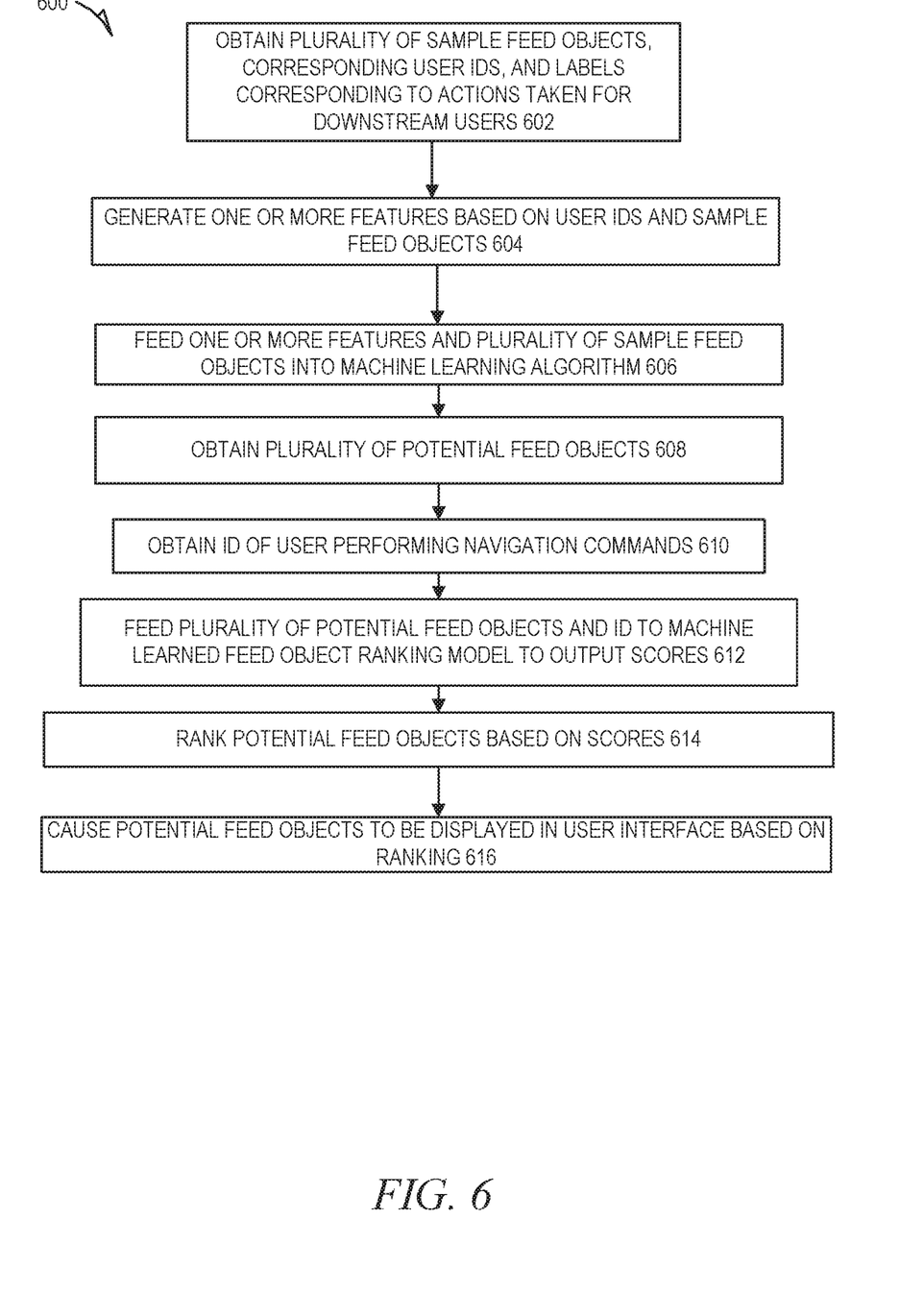
FIG. 6 is a flow diagram illustrating a method for ranking potential objects in a feed in a user interface of a social networking service, in accordance with an example embodiment.

FIG. 6 is a flow diagram illustrating a method 600 for ranking potential objects in a feed in a user interface of a social networking service, in accordance with an example embodiment. At operation 602, a plurality of sample feed objects, corresponding user identifications, and labels corresponding to actions taken by downstream users on the corresponding sample feed objects are obtained. At operation 604, one or more features based on information derived from the corresponding user identifications and based on the sample feed objects are generated. At operation 606, the one or more features and the plurality of sample feed objects are fed to a machine learning algorithm to train the machine learned feed object ranking model. At this point the machine learned feed object ranking model is trained and can be used in real-world situations where feed objects need to be ranked.

At operation 603, a plurality of potential feed objects are obtained, wherein each potential feed object includes a data structure containing a piece of information that could potentially be displayed in a feed on a user interface of a social networking service. At operation 610, an identification of a user performing a navigation command in the user interface is obtained, the navigation command causing the feed to be displayed or updated. At operation 612, the identification of the user and the plurality of potential feed objects are fed to a machine learned feed object ranking model, the feed object ranking model having been trained via a machine learning algorithm to calculate a score for each of the potential feed objects, the score being based on a combination of a likelihood that the user will perform an interaction, via the user interface, on the potential feed object, likelihoods that the user's interaction will cause one or more downstream events by other users, and the value of the one or more downstream events to the social networking service. At operation 614, the plurality of potential feed objects are ranked by their scores calculated by the machine learned feed object ranking model. At operation 616, one or more of the potential feed objects are caused to be displayed in the feed in the user interface based on the ranking.

Figure 7:
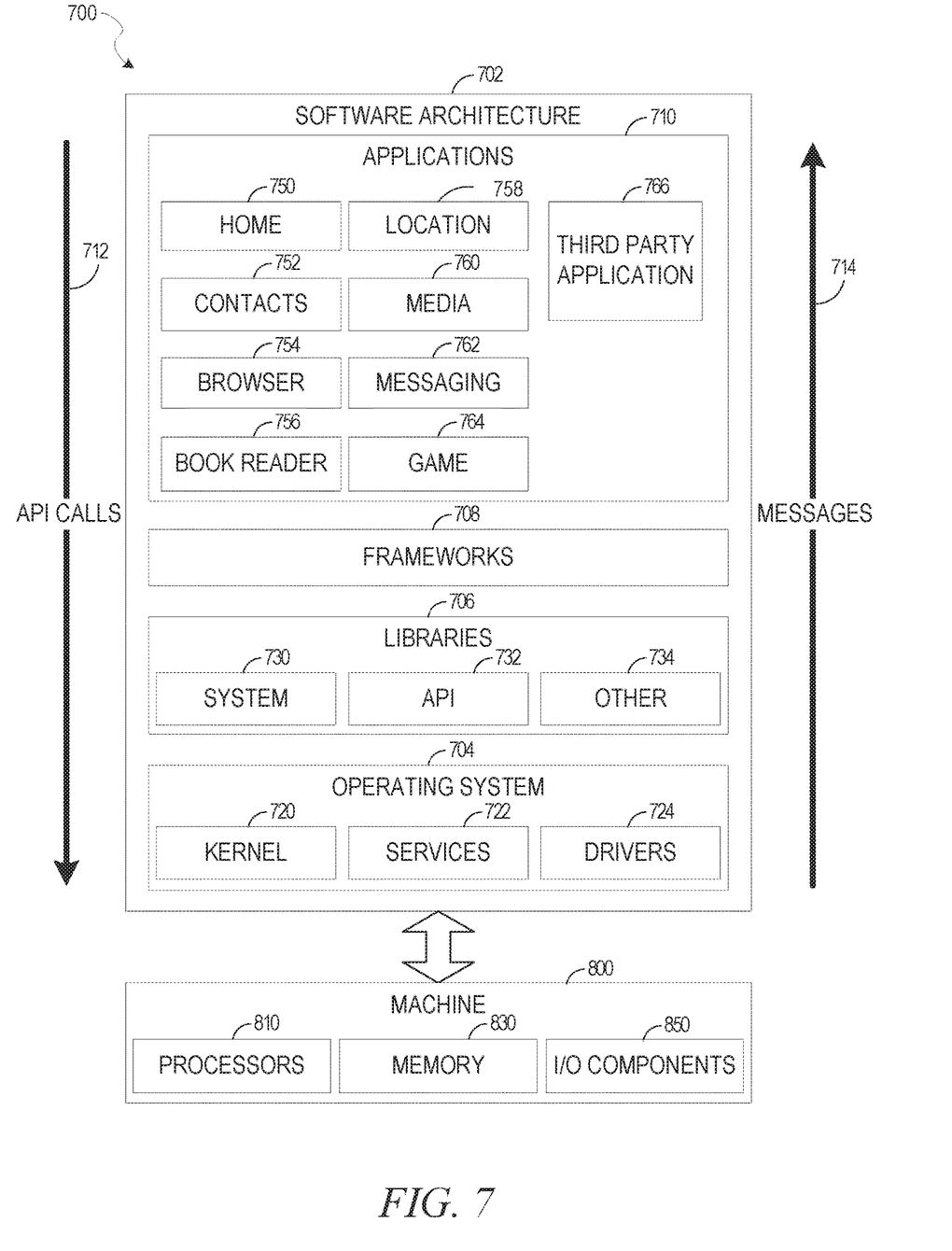
FIG. 7 is a block diagram illustrating an architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
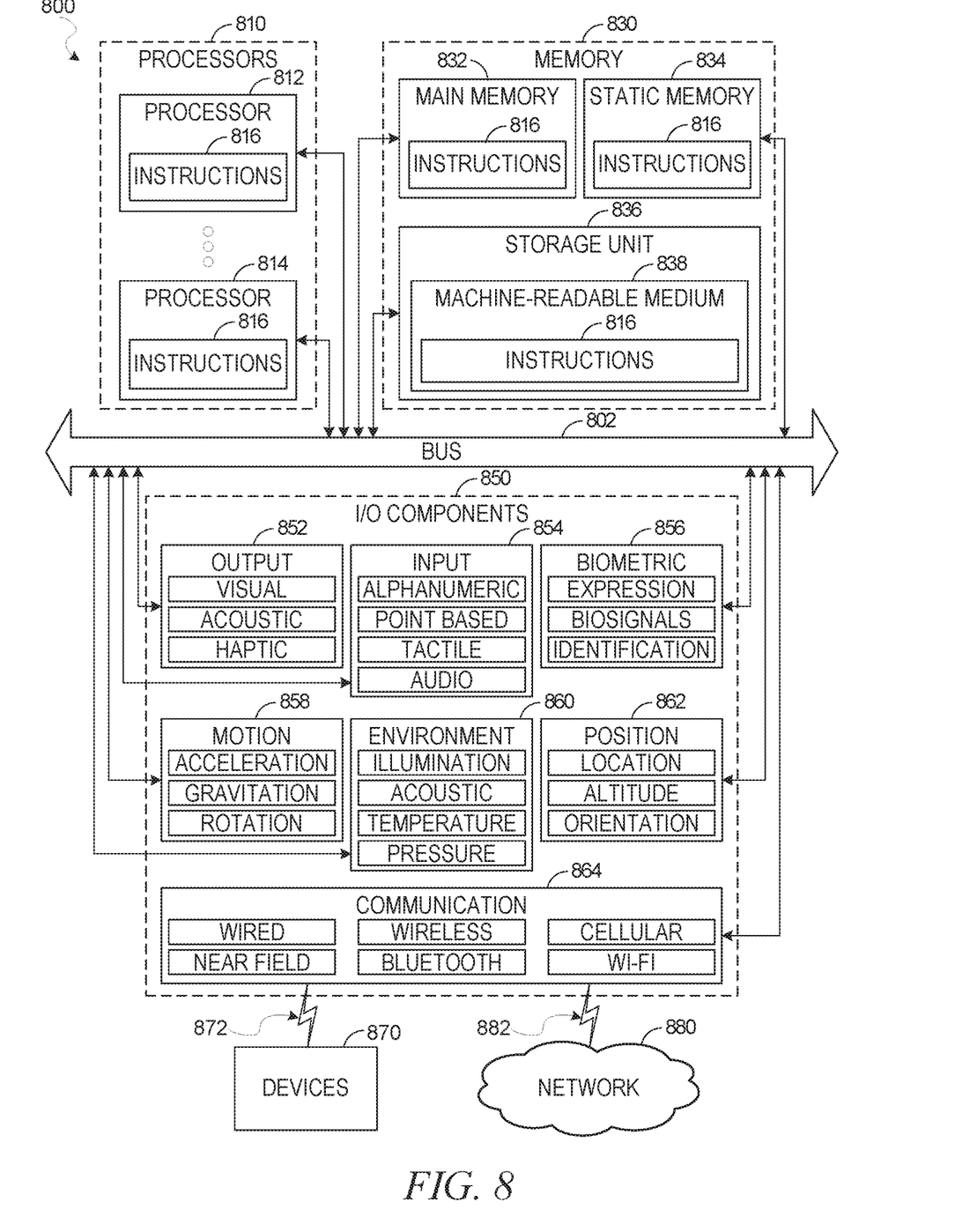
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine to perform any one or more of the methodologies discussed herein, according to an example embodiment. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein may be executed. For example, the instructions 816 may cause the machine 800 to execute the method 600 of FIG. 6. Additionally, or alternatively, the instructions 816 may implement FIGS. 1-6, and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine 800 will depend on the type of machine 800. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 830, 832, 834, and/or memory of the processor(s) 810) and/or the storage unit 836 may store one or more sets of instructions 816 and data structures (e.g., software) embodying or utilized by an one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to the processors 810. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, as extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 816 may be transmitted or received over the network 880 using a transmission medium via a network interface device (e.g., a network interface component included in the communication components 864) and utilizing an one of a number of well-known transfer protocols (e.g., HTTP). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   a memory; and
   a computer-readable medium having instructions stored thereon, which, when executed by a processor, cause the system to:
   obtain a plurality of potential feed objects, wherein each potential feed object includes a data structure containing a piece of information that could potentially be displayed in a feed in a user interface of a social networking service;
   obtain an identification of a user performing a navigation command in the user interface, the navigation command causing the feed to be displayed or updated;
   feed the identification of the user and the plurality of potential feed objects to a machine learned feed object ranking model, the machine learned feed object ranking model having been trained via a machine learning algorithm to calculate a score for each of the potential feed objects, the score being based on a combination of:
   (1) likelihood that the user will perform an interaction, via the user interface, on the potential feed object,
   (2) likelihoods that the user's interaction will cause one or more subsequent downstream events by other users, and
   (3) a value of the one or more downstream events to the social networking service, wherein a downstream event is an interaction, by a user other than the user, with a feed item that is displayed to the user other than the user in response to the user interacting with the feed item;
   rank the plurality of potential feed objects by their scores calculated by the machine learned feed object ranking model; and
   cause one or more of the potential feed objects to be displayed in the feed in the user interface based on the ranking.

2. The system of claim 1, wherein the instructions further cause the system to:
   obtain a plurality of sample feed objects, corresponding user identifications, and labels corresponding to actions taken by downstream users on the corresponding sample feed objects;
   generate one or more features based on information derived from the corresponding user identifications and based on the sample feed objects; and
   feed the one or more features and the plurality of sample feed objects to the machine learning algorithm to train the machine learned feed object ranking model.

3. The system of claim 1, wherein the machine learning algorithm is a binary logistic regression algorithm.

4. The system of claim 1, wherein the scores E (m, u) are calculated based on possible types of interactions on a potential feed object taken by a user, possible types of viral actions, incremental downstream engagement on the potential feed object if the user takes a viral action, and a time discount factor determining the value of engagement in a current session versus that in a later session.

5. The system of claim 4, wherein the possible types of interactions on a potential feed object include click, like, share, comment, job view, and connect.

6. The system of claim 2, wherein the generating the one or more features includes retrieving a plurality of user profiles corresponding to the corresponding user identifications and generating the one or more features from the plurality of user profiles.

7. The system of claim 2, wherein the generating the one or more features includes retrieving usage history corresponding to the corresponding user identifications and generating the one or more features from the usage history.

8. A method comprising:
   obtaining a plurality of potential feed objects, wherein each potential feed object includes a data structure containing a piece of information that could potentially be displayed in a feed in a user interface of a social networking service;
   obtaining an identification of a user performing a navigation command in the user interface, the navigation command causing the feed to be displayed or updated;
   feeding the identification of the user and the plurality of potential feed objects to a machine learned feed object ranking model, the machine learned feed object ranking model having been trained via a machine learning algorithm to calculate a score for each of the potential feed objects, the score being based on a combination of:
   (1) a likelihood that the user will perform an interaction, via the user interface, on the potential feed object,
   (2) likelihoods that the user's interaction will cause one or more subsequent downstream events by other users, and
   (3) a value of the one or more downstream events to the social networking service, wherein a downstream event is an interaction, by a user other than the user, with a feed item that is displayed to the user other than the user in response to the user interacting with the feed item;
   ranking the plurality of potential feed objects by their scores calculated by the machine learned feed object ranking model; and
   causing one or more of the potential feed objects to be displayed in the feed in the user interface based on the ranking.

9. The method of claim 8, further comprising:
   obtaining a plurality of sample feed objects, corresponding user identifications, and labels corresponding to actions taken by downstream users on the corresponding sample feed objects;

generating one or more features based on information derived from the corresponding user identifications and based on the sample feed objects; and feeding the one or more features and the plurality of sample feed objects to the machine learning algorithm to train the machine learned feed object ranking model.

10. The method of claim 8, wherein the machine learning algorithm is a binary logistic regression algorithm.

11. The method of claim 8, wherein the scores E (m, u) are calculated based on possible types of interactions on a potential feed object taken by a user, possible types of viral actions, incremental downstream engagement on the potential feed object if the user takes a viral action, and a time discount factor determining the value of engagement in a current session versus that in a later session.

12. The method of claim 11, wherein the possible types of interactions on a potential feed object include click, like, share, comment, job view, and connect.

13. The method of claim 9, wherein the generating the one or more features includes retrieving a plurality of user profiles corresponding to the corresponding user identifications and generating the one or more features from the plurality of user profiles.

14. The method of claim 9, wherein the generating the one or more features includes retrieving usage history corresponding to the corresponding user identifications and generating the one or more features from the usage history.

15. A non-transitory machine-readable storage medium comprising instructions which, when implemented by one or more machines, cause the one or more machines to perform operations comprising:

obtaining a plurality of potential feed objects, wherein each potential feed object includes a data structure containing a piece of information that could potentially be displayed in a feed in a user interface of a social networking service;

obtaining an identification of a user performing a navigation command in the user interface, the navigation command causing the feed to be displayed or updated;

feeding the identification of the user and the plurality of potential feed objects to a machine learned feed object ranking model, the machine learned feed object ranking model having been trained via a machine learning algorithm to calculate a score for each of the potential feed objects, the score being based on a combination of:

(1) a likelihood that the user will perform an interaction, via the user interface, on the potential feed object, (2) likelihoods that the user's interaction will cause one or more subsequent downstream events by other users, and (3) a value of the one or more downstream events to the social networking service, wherein a downstream event is an interaction, by a user other than the user, with a feed item that is displayed to the user other than the user in response to the user interacting with the feed item;

ranking the plurality of potential feed objects by their scores calculated by the machine learned feed object ranking model; and causing one or more of the potential feed objects to be displayed in the feed in the user interface based on the ranking.

16. The non-transitory machine-readable storage medium of claim 15, wherein the operations further comprise:

obtaining a plurality of sample feed objects, corresponding user identifications, and labels corresponding to actions taken by downstream users on the corresponding sample feed objects;

generating one or more features based on information derived from the corresponding user identifications and based on the sample feed objects; and feeding the one or more features and the plurality of sample feed objects to the machine learning algorithm to train the machine learned feed object ranking model.

17. The non-transitory machine-readable storage medium of claim 15, wherein the machine learning algorithm is a binary logistic regression algorithm.

18. The non-transitory machine-readable storage medium of claim 15, wherein the scores E (m, u) are calculated based on possible types of interactions on a potential feed object taken by a user, possible types of viral actions, incremental downstream engagement on the potential feed object if the user takes a viral action, and a time discount factor determining the value of engagement in a current session versus that in a later session.

19. The non-transitory machine-readable storage medium of claim 18, wherein the possible types of interactions on a potential feed object include click, like, share, comment, job view, and connect.

20. The non-transitory machine-readable storage medium of claim 16, wherein the generating the one or more features includes retrieving a plurality of user profiles corresponding to the corresponding user identifications and generating the one or more features from the plurality of user profiles.

* * * * *